(12) United States Patent
Lin et al.

(10) Patent No.: US 10,613,350 B2
(45) Date of Patent: Apr. 7, 2020

(54) ELECTRICALLY FOCUS-TUNABLE LENS AND EYEWEAR INCLUDING THE SAME

(71) Applicant: National Chiao Tung University, Hsinchu (TW)

(72) Inventors: Yi-Hsin Lin, Zhubei (TW); Hung-Chun Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 158 days.

(21) Appl. No.: 16/004,506

(22) Filed: Jun. 11, 2018

(65) Prior Publication Data
US 2019/0113771 A1   Apr. 18, 2019

(30) Foreign Application Priority Data

Oct. 16, 2017 (TW) ................... 106135306

(51) Int. Cl.
*G02C 7/08* (2006.01)
*G02F 1/29* (2006.01)
*G02C 7/06* (2006.01)

(52) U.S. Cl.
CPC ............ *G02C 7/083* (2013.01); *G02C 7/06* (2013.01); *G02C 7/061* (2013.01); *G02F 1/29* (2013.01); *G02F 2001/294* (2013.01); *G02F 2201/121* (2013.01)

(58) Field of Classification Search
CPC .......... G02C 7/083; G02C 7/06; G02C 7/061; G02F 2001/294; G02F 1/29; G02F 2201/121

USPC ............................................. 349/13
See application file for complete search history.

(56) References Cited

U.S. PATENT DOCUMENTS

| 7,654,667 | B2 | 2/2010 | Blum et al. | |
|---|---|---|---|---|
| 2010/0177277 | A1* | 7/2010 | Kokonaski | G02C 7/083 351/159.39 |
| 2015/0277151 | A1* | 10/2015 | Yadin | G02F 1/0121 351/159.39 |

OTHER PUBLICATIONS

Liwei Li, Doug Bryant and Philip J. Bos, "Liquid crystal lens with concentric electrodes and inter-electrode resistors" Liq. Cryst. Rev. 2, 130-154 (2014).

* cited by examiner

*Primary Examiner* — Nathanael R Briggs
*Assistant Examiner* — William D Peterson
(74) *Attorney, Agent, or Firm* — Hammer & Associates, P.C.

(57) ABSTRACT

An electrically focus-tunable lens of an active matrix type includes a basic lens and a transparent phase modulator which includes a first transparent substrate, a second transparent substrate, a liquid crystal layer, a common electrode unit, a phase modulation electrode unit, and an array of thin film transistors. Each liquid crystal portion of the liquid crystal layer is independently controlled by applying a predetermined voltage between the common electrode and a corresponding one of data electrode strips of the phase modulation electrode unit to provide each pixel area of the transparent phase modulator with an independent refractive index so as to create a phase modulation profile for the transparent phase modulator.

11 Claims, 4 Drawing Sheets

ELECTRICALLY FOCUS-TUNABLE LENS AND EYEWEAR INCLUDING THE SAME

CROSS-REFERENCE TO RELATED APPLICATION

This application claims priority of Taiwanese Application No. 106135306, filed on Oct. 16, 2017.

FIELD

The disclosure relates to an electrically focus-tunable lens, more particularly to an electrically focus-tunable lens of an active matrix type. The disclosure also relates to eyewear including the electrically focus-tunable lens.

BACKGROUND

When a person with myopia develops presbyopia with age, he/she usually needs a separate pair of reading glasses or uses multi-focal lenses.

A conventional multi-focal lens such as a bifocal lens typically has multiple regions each having a different diopter. However, such a multi-focal lens has an optical aberration, and transition between the regions having different diopters is abrupt, which may make the wearer feel uncomfortable. In addition, since the diopter of each of the regions is fixed, it cannot be tuned according to the wearer's requirement.

U.S. Pat. No. 7,654,667 discloses a progressive addition lens operating in combination with a multi-order diffractive optic. It is disclosed therein an electro-active lens which has an electro-active diffractive addition region for making a diffractive addition region electro-active. The electro-active diffractive addition region includes two transparent electrodes, two alignment layers, an electro-active material, two electrical insulating layers, and drive electronics. The electro-active material may include, for example, a nematic liquid crystal or a cholesteric liquid crystal (CLC). However, since transparent electrodes are in the form of a common electrode, tuning of the diopter of the electro-active diffractive addition region is limited.

US 2015/0277151 discloses an optical device which includes an electro-optical layer, having an effective local index of refraction at any given location within an active area of the electro-optical layer that is determined by a voltage waveform applied across the electro-optical layer at the location. An array of excitation electrodes including parallel conductive stripes extending over the active area is disposed over one or both sides of the electro-optical layer. Control circuitry is coupled to apply respective control voltage waveforms to the excitation electrodes and is configured to concurrently modify the respective control voltage waveforms applied to excitation electrodes so as to generate a specified phase modulation profile in the electro-optical layer. Since the optical device is a passive matrix focusing device, the driving capability thereof for integrated circuits of high resolution products is limited and it is required to apply actuation voltage continuously.

SUMMARY

An object of the disclosure is to provide an electrically focus-tunable lens of an active matrix type.

Another object of the disclosure is to provide eyewear including the electrically focus-tunable lens.

According to a first aspect of the disclosure, there is provided an electrically focus-tunable lens which comprises a basic lens and a transparent phase modulator.

The basic lens defines an optical axis and has a front surface configured to focus incident light onto a focal point at the optical axis. The focal point is distant from the basic lens by a first focal length.

The transparent phase modulator has a normal axis, and is disposed to bring the normal axis in line with the optical axis and is disposed rearwardly of the front surface of the basic lens. The transparent phase modulator includes a first transparent substrate, a second transparent substrate, a liquid crystal layer, a common electrode unit, a phase modulation electrode unit, and an array of thin film transistors.

The first transparent substrate is disposed proximate to the front surface of the basic lens.

The second transparent substrate is spaced apart from the first transparent substrate along the normal axis.

The liquid crystal layer is disposed between the first transparent substrate and the second transparent substrate, and includes an array of liquid crystal portions.

The common electrode unit is disposed between the liquid crystal layer and one of the first and second transparent substrates.

The phase modulation electrode unit is disposed between the liquid crystal layer and the other of the first and second transparent substrates, and includes a plurality of data electrode strips, a plurality of scan electrode strips, and an array of pixel electrodes.

The data electrode strips are disposed on said the other of the first and second transparent substrates, extend in a first direction, and are displaced from each other in a second direction transverse to the first direction.

The scan electrode strips are disposed on said the other of the first and second transparent substrates, extend in the second direction, and are displaced from each other in the first direction to define, in cooperation with the data electrode strips, an array of pixel areas which correspond to the array of the liquid crystal portions of the liquid crystal layer.

Each of the pixel electrodes is disposed in a respective one of the pixel areas.

Each of the thin film transistors is disposed in the respective one of the pixel areas, and includes a source electrically connected to a corresponding one of the data electrode strips, a drain electrically connected to a respective one of the pixel electrodes, and a gate electrically connected to a corresponding one of the scan electrode strips to permit each of the liquid crystal portions of the liquid crystal layer to be independently controlled by applying a predetermined voltage between the common electrode and a corresponding one of the data electrode strips to provide each of the pixel areas with an independent refractive index such that a phase modulation profile for the transparent phase modulator is created to tune the first focal length of the basic lens so as to permit the electrically focus-tunable lens to have at least one vision region with a second focal length different from the first focal length.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
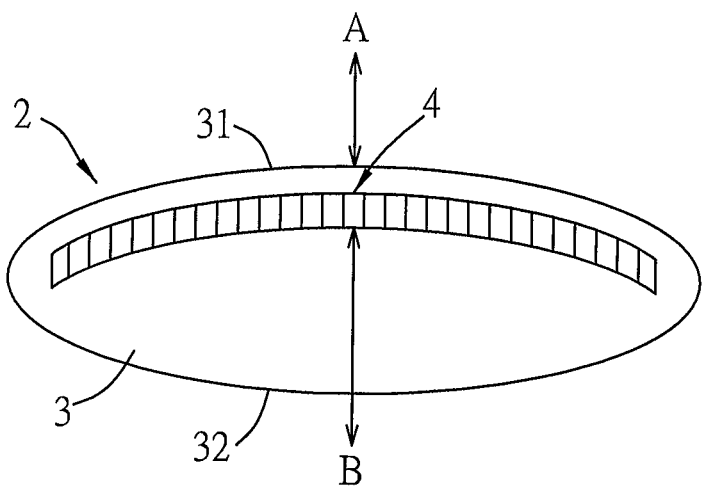
FIG. 1 is a schematic view of a first embodiment of an electrically focus-tunable lens according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
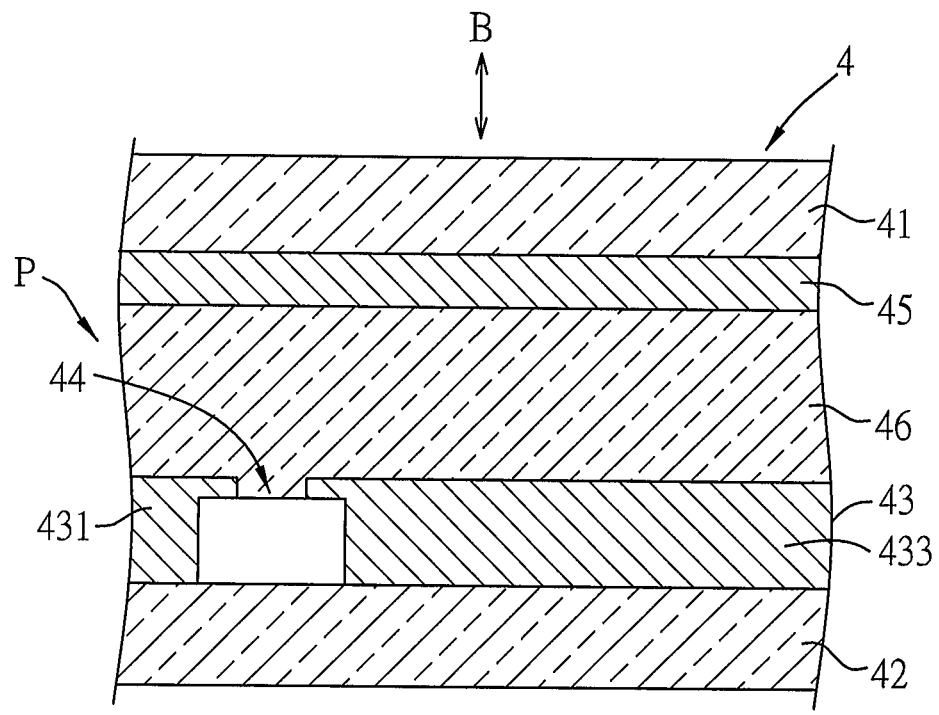
FIG. 2 is a fragmentary sectional view of a transparent phase modulator included in the first embodiment.
Figure 3:
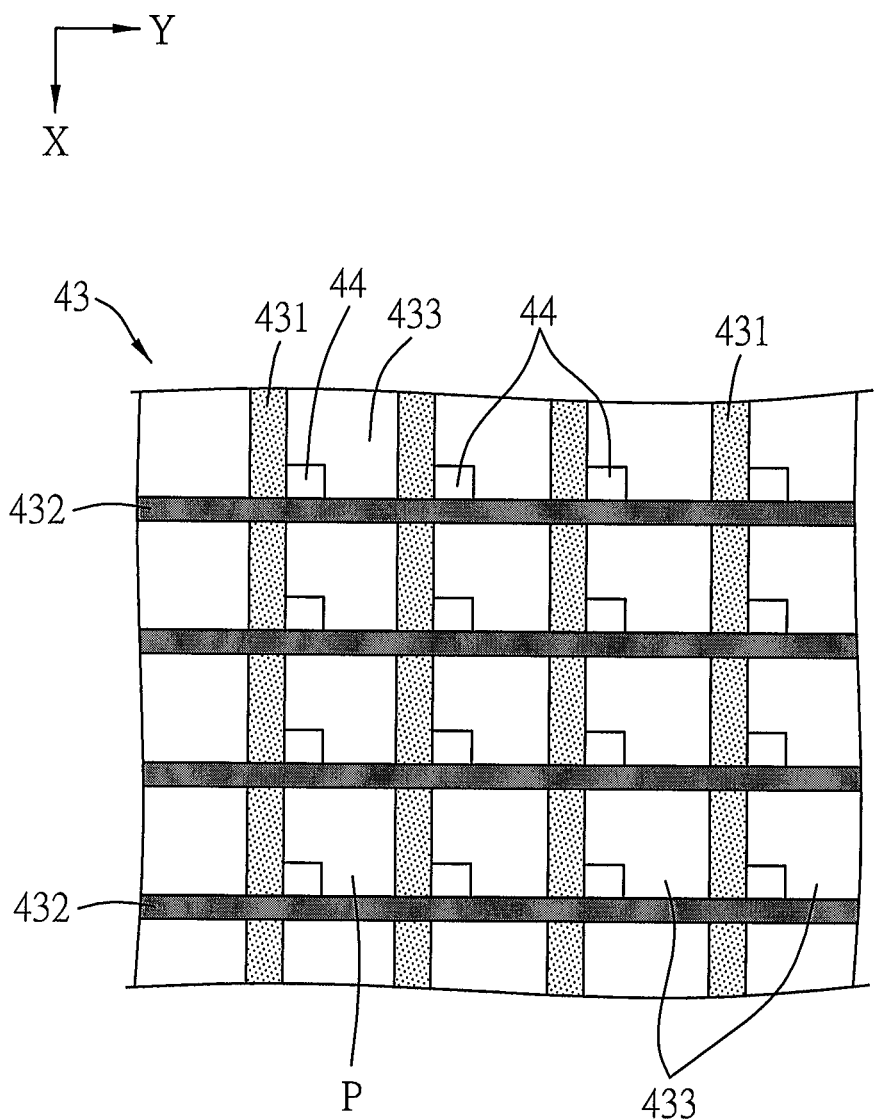
FIG. 3 is a fragmentary schematic view showing an arrangement of a phase modulation electrode unit and an array of thin film transistors included in the transparent phase modulator.

Referring to FIGS. 1, 2, and 3, a first embodiment of an electrically focus-tunable lens 2 according to the disclosure may be used for eyewear worn by a person having at least one of vision conditions, such as myopia, hyperopia, and astigmatism. The electrically focus-tunable lens 2 includes a basic lens 3 and a transparent phase modulator 4.

The basic lens defines an optical axis (A) and has a front surface 31 configured to focus incident light onto a focal point at the optical axis. The focal point is distant from the basic lens 3 by a first focal length. The basic lens 3 has a predetermined diopter (Ps), which corresponds to the first focal length, and may be a concave lens, a convex lens, and a combination thereof. In the embodiment, the basic lens 3 is a convex lens.

The transparent phase modulator 4 has a normal axis (B). The transparent phase modulator 4 is disposed to bring the normal axis (B) in line with the optical axis (A) and is disposed rearwardly of the front surface 31 of the basic lens 3. The transparent phase modulator 4 includes a first transparent substrate 41, a second transparent substrate 42, a liquid crystal layer 46, a common electrode unit 45, a phase modulation electrode unit 43, and an array of thin film transistors 44.

The first transparent substrate 41 is disposed proximate to the front surface 31 of the basic lens 3, and is pliable.

The second transparent substrate 42 is spaced apart from the first transparent substrate 41 along the normal axis (B).

Each of the first and second transparent substrates 41, 42 may be made from a pliable polymeric material, a pliable and thin glass material, or the like. Since the first and second transparent substrates 41, 42 are pliable, the transparent phase modulator 4 thus formed may be disposed in the basic lens 3 in a desirable curvature.

The liquid crystal layer 46 is disposed between the first transparent substrate 41 and the second transparent substrate 42, and includes an array of liquid crystal portions.

The common electrode unit 45 is disposed between the liquid crystal layer 46 and one of the first and second transparent substrates 41, 42. In the illustrated embodiment, the common electrode unit 45 is disposed between the liquid crystal layer 46 and the first transparent substrates 41.

The phase modulation electrode unit 43 is disposed between the liquid crystal layer 46 and the other of the first and second transparent substrates 41, 42. In the illustrated embodiment, the phase modulation electrode unit 43 is disposed between the liquid crystal layer 46 and the second transparent substrate 42. The phase modulation electrode unit 43 includes a plurality of data electrode strips 431, a plurality of scan electrode strips 432, and an array of pixel electrodes 433.

The data electrode strips 431 are disposed on the second transparent substrate 42, extend in a first direction (x), and are displaced from each other in a second direction (y) transverse to the first direction (x).

The scan electrode strips 432 are disposed on the second transparent substrate 42, extend in the second direction (y), and are displaced from each other in the first direction (x) to define, in cooperation with the data electrode strips 431, an array of pixel areas (P) which corresponds to the array of the liquid crystal portions of the liquid crystal layer (46).

Each of the pixel electrodes 433 is disposed in a respective one of the pixel areas (P).

Each of the thin film transistors 44 is transparent and is disposed in the respective one of the pixel areas (P), and includes a source electrically connected to a corresponding one of the data electrode strips 431, a drain electrically connected to a respective one of the pixel electrodes 433, and a gate electrically connected to a corresponding one of the scan electrode strips 432 such that each of the liquid crystal portions of the liquid crystal layer 46 is independently controlled by applying a predetermined voltage between the common electrode 45 and a corresponding one of the data electrode strips 431, and is independently and actively driven by a respective one of the thin film transistors 44. Therefore, each of the pixel areas (P) is provided with an independent refractive index to create a phase modulation profile for the transparent phase modulator 4 so as to tune the first focal length of the basic lens 3, thereby permitting the electrically focus-tunable lens 2 to have at least one vision region with a second focal length which is different from the first focal length.

Each of the common electrode 45, the data electrode strips 431, the scan electrode strips 432, and the pixel electrodes 433 is made from a transparent material selected from the group consisting of indium tin oxide, indium zinc oxide, a silver nanowire, a metal-mesh conductive film, a conductive polymer, a complex material, and combinations thereof.

The liquid crystal layer 46 is made from a material selected from the group consisting of a single-layer polarization-independent liquid crystal material, a double-layer liquid crystal structure with an orthogonal rubbing direction, and a combination thereof.

Each of the thin film transistors 44 is electrically connected in series to a corresponding one of the data electrode strips 431 and a respective one of the pixel electrodes 433. Furthermore, each of the thin film transistors 44 is used as a photoelectric switch for controlling an electric potential of the respective one of the pixel electrodes 433. In order to avoid electric leakage from the thin film transistors 44, a plurality of the thin film transistors 44 electrically connected in series may be used for electrically connecting the corresponding one of the data electrode strips 431 and the respective one of the pixel electrodes 433. In addition, the liquid crystal layer 46 includes a liquid crystal capacitor. The transparent phase modulator 4 may further include a plurality of storage capacitors electrically connected in parallel to the liquid crystal capacitor so as to maintain the voltage of the liquid crystal layer 46.

Figure 4:
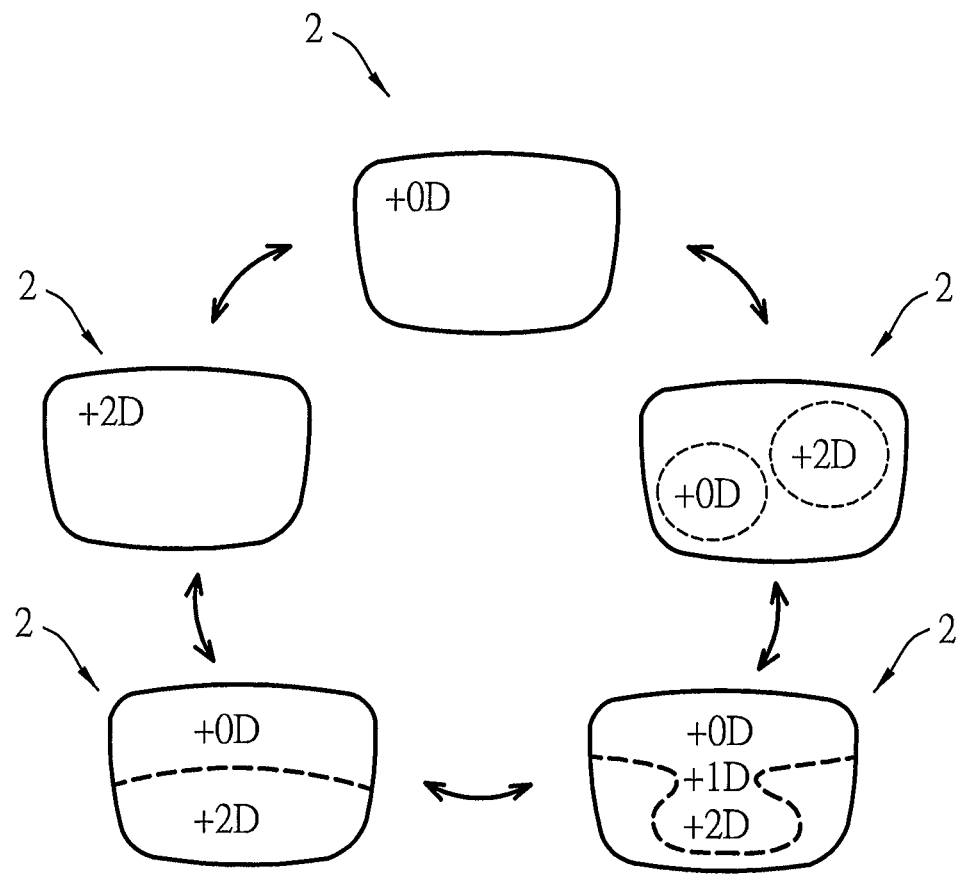
FIG. 4 is a schematic view showing the first embodiment which may have one or more vision regions with diopters tunable by the transparent phase modulator.

Referring to FIG. 4, as described above, each of the liquid crystal portions of the liquid crystal layer 46 is independently controlled by applying a predetermined voltage between the common electrode 45 and a corresponding one of the data electrode strips 431, and is independently and actively driven by a respective one of the thin film transistors 44 to provide each of the pixel areas (P) with an independent refractive index to create a phase modulation profile for the transparent phase modulator 4 so as to tune the first focal length of the basic lens 3, thereby permitting the electrically focus-tunable lens 2 to have at least one vision region with a second focal length which is different from the first focal length. In other words, the basic lens 3 has a predetermined diopter ($P_s$), which corresponds to the first focal length. The transparent phase modulator 4 having the created phase modulation profile may have an additional diopter ($P_{LC}$). The electrically focus-tunable lens 2 is thus permitted to have a total diopter ($P_t$) which corresponds to the second focal length and which is equal to a sum of the predetermined diopter ($P_s$) and the additional diopter ($P_{LC}$).

Specifically, since each of the liquid crystal portions of the liquid crystal layer 46 is independently controlled by applying a predetermined voltage between the common electrode 45 and a corresponding one of the data electrode strips 431 and is independently and actively driven by a respective one of the thin film transistors 44 to provide each of the pixel areas (P) with an independent refractive index, the phase modulation profile may permit the electrically focus-tunable lens 2 to have one vision region with the second focal length (i.e., to have one vision region with one diopter) or to have a plurality of vision regions with the second focal lengths, at least two of which are different from each other (i.e., to have a plurality of vision regions with a plurality of diopters at least two of which are different from each other). Therefore, the electrically focus-tunable lens 2 may be provided with, for example, a distant vision region, an intermediate vision region, and a near vision region according the specific requirement of a wearer. Furthermore, since each of the liquid crystal portions of the liquid crystal layer 46 is independently controlled to provide each of the pixel areas (P) with an independent refractive index, the phase modulation profile thus created in the transparent phase modulator 4 is in the form of a continuous profile and the problems of abrupt diopter transition and optical aberration encountered in the prior art may be overcome.

Figure 5:
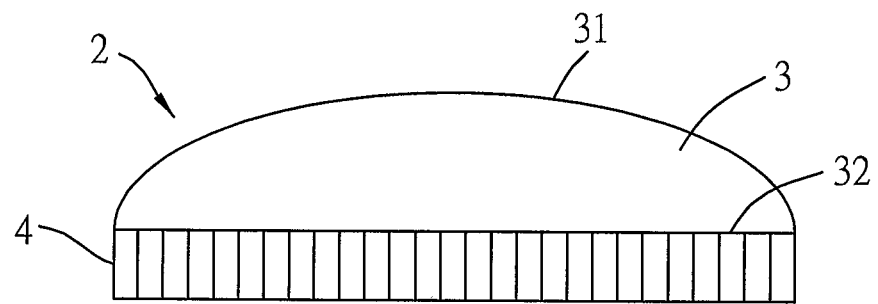
FIG. 5 is a schematic view of a second embodiment of an electrically focus-tunable lens according to the disclosure.

Referring to FIG. 5, a second embodiment of an electrically focus-tunable lens 2 according to the disclosure is shown to be similar to the first embodiment except that the transparent phase modulator 4 is disposed on a rear surface 32 of the basic lens 3 opposite to the front surface 31.

Specifically, when the basic lens 3 is a plano-convex lens, as illustrated in FIG. 5, or a plano-concave lens, the transparent phase modulator 4 in the form of a flat sheet is attached to the rear surface 32 of the basic lens 3. In this case, the first and second transparent substrates 41, 42 for the transparent phase modulator 4 may be made from, for example, a rigid glass.

Figure 6:
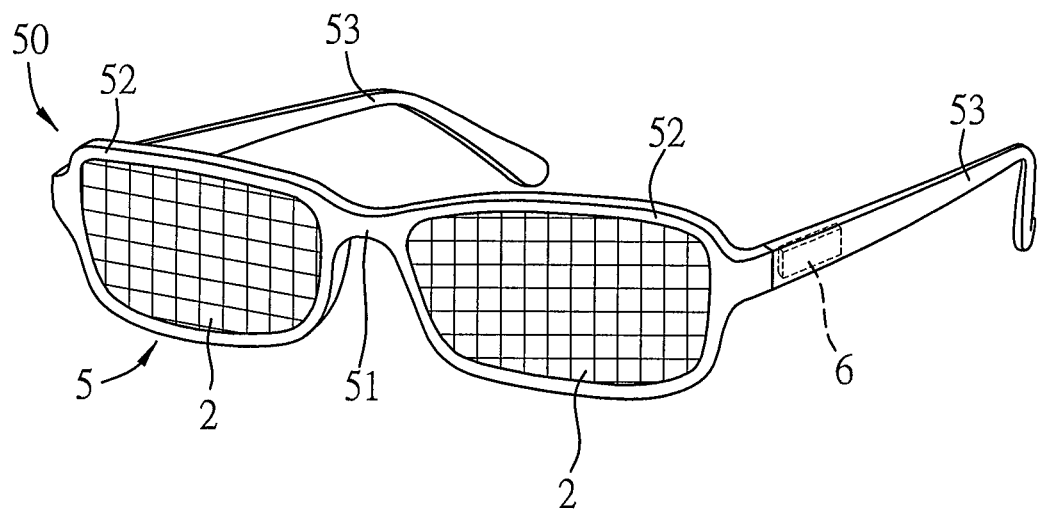
FIG. 6 is a schematic perspective view of an embodiment of eyewear according to the disclosure.

Referring to FIG. 6, an embodiment of eyewear 50 according to the disclosure comprises an eyewear frame 5, a pair of the electrically focus-tunable lenses 2, and a circuit controller 6. The eyewear frame 5 includes a nose bridge 51, a pair of lens support frame portions 52 interconnected by the nose bridge 51, and a pair of temple portions 53 pivotally and respectively attached to the lens support frame portions 52. The electrically focus-tunable lenses 2 are supported by the lens support frame portions 52, respectively. The circuit controller 6 is disposed at one of the temple portions 53 and is electrically connected to the electrically focus-tunable lenses 2. A commercially available driver integrated circuit for driving a liquid crystal display may be used as the circuit controller 6. The circuit controller 6 may be wirelessly operated. In addition, an eye tracking system (not shown in FIG. 6) may be installed on the eyewear 50.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electrically focus-tunable lens, comprising:
   a basic lens defining an optical axis and having a front surface configured to focus incident light onto a focal point at said optical axis, the focal point being distant from said basic lens by a first focal length; and
   a transparent phase modulator having a normal axis, and being disposed to bring the normal axis in line with the optical axis and being disposed rearwardly of said front surface of said basic lens, said transparent phase modulator including:
      a first transparent substrate disposed proximate to said front surface of said basic lens,
      a second transparent substrate spaced apart from said first transparent substrate along the normal axis,
      a liquid crystal layer which is disposed between said first transparent substrate and said second transparent substrate and which includes an array of liquid crystal portions,
      a common electrode unit disposed between said liquid crystal layer and one of said first and second transparent substrates,
      a phase modulation electrode unit disposed between said liquid crystal layer and the other of said first and second transparent substrates, said phase modulation electrode unit including:
         a plurality of data electrode strips disposed on said the other of said first and second transparent substrates, extending in a first direction, and displaced from each other in a second direction transverse to the first direction,
         a plurality of scan electrode strips disposed on said the other of said first and second transparent substrates, extending in the second direction, and displaced from each other in the first direction to define, in cooperation with said data electrode strips, an array of pixel areas which corresponds to said array of said liquid crystal portions of said liquid crystal layer, and
         an array of pixel electrodes each disposed in a respective one of said pixel areas,
      and an array of thin film transistors each of which is disposed in said respective one of said pixel areas and each of which includes a source electrically connected to a corresponding one of said data electrode strips, a drain electrically connected to a respective one of said pixel electrodes, and a gate electrically connected to a corresponding one of said scan electrode strips to permit each of said liquid crystal portions of said liquid crystal layer to be independently controlled by applying a predetermined voltage between said common electrode and a corresponding one of said data electrode strips to provide each of said pixel areas with an independent refractive index such that a phase modulation profile for said transparent phase modulator is created to tune the first focal length of said basic lens so as to permit the electrically focus-tunable lens to have at least one vision region with a second focal length different from the first focal length.

2. The electrically focus-tunable lens according to claim 1, wherein said phase modulation profile permits the electrically focus-tunable lens to have a plurality of vision regions with the second focal lengths, at least two of which are different from each other.

3. The electrically focus-tunable lens according to claim 1, wherein said transparent phase modulator is disposed in said basic lens.

4. The electrically focus-tunable lens according to claim 1, wherein said basic lens further has a rear surface opposite to said front surface, and said transparent phase modulator is disposed on said rear surface of said basic lens.

5. The electrically focus-tunable lens according to claim 1, wherein said first and second transparent substrates are pliable.

6. The electrically focus-tunable lens according to claim 1, wherein said basic lens is selected from the group consisting of a concave lens, a convex lens, and a combination thereof.

7. The electrically focus-tunable lens according to claim 1, wherein said liquid crystal layer includes a liquid crystal capacitor, and said transparent phase modulator further includes a plurality of storage capacitors electrically connected in parallel to said liquid crystal capacitor.

8. The electrically focus-tunable lens according to claim 1, wherein said thin film transistors are transparent.

9. The electrically focus-tunable lens according to claim 1, wherein each of said common electrode, said data electrode strips, said scan electrode strips, and said pixel electrodes is made from a transparent material selected from the group consisting of indium tin oxide, indium zinc oxide, a silver nanowire, a metal-mesh conductive film, a conductive polymer, a complex material, and combinations thereof.

10. The electrically focus-tunable lens according to claim 1, wherein said liquid crystal layer is made from a material selected from the group consisting of a single-layer polarization-independent liquid crystal material, a double-layer liquid crystal structure with an orthogonal rubbing direction, and a combination thereof.

11. Eyewear, comprising:
an eyewear frame including a nose bridge, a pair of lens support frame portions interconnected by said nose bridge, and a pair of temple portions pivotally and respectively attached to said lens support frame portions;
the electrically focus-tunable lens according to claim 1 supported by each of said lens support frame portions; and
a circuit controller disposed at one of said temple portions and electrically connected to the electrically focus-tunable lens.

* * * * *